US012759257B2

(12) United States Patent
Hattori et al.

(10) Patent No.: US 12,759,257 B2
(45) Date of Patent: Oct. 13, 2026

(54) OPTICAL MULTILAYER BODY AND METHOD FOR PRODUCING OPTICAL MULTILAYER BODY

(71) Applicant: NITTO DENKO CORPORATION, Ibaraki (JP)

(72) Inventors: Daisuke Hattori, Ibaraki (JP); Ryota Morishima, Ibaraki (JP); Makoto Nakamura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/847,888

(22) PCT Filed: Feb. 27, 2023

(86) PCT No.: PCT/JP2023/006971

§ 371 (c)(1),
(2) Date: Sep. 17, 2024

(87) PCT Pub. No.: WO2023/189089

PCT Pub. Date: Oct. 5, 2023

(65) Prior Publication Data

US 2025/0199230 A1 Jun. 19, 2025

(30) Foreign Application Priority Data

Mar. 31, 2022 (JP) ................................ 2022-059230

(51) Int. Cl.
*B32B 3/10* (2006.01)
*F21V 8/00* (2006.01)

(52) U.S. Cl.
CPC ................ *B32B 3/10* (2013.01); *G02B 6/005* (2013.01); *G02B 6/0088* (2013.01);
(Continued)

(58) Field of Classification Search
CPC ................ B32B 3/10; B32B 2307/412; B32B 2307/414; B32B 2307/418; G02B 6/005; G02B 6/0088
(Continued)

(56) References Cited

U.S. PATENT DOCUMENTS 11,994,709 B2 5/2024 Yoshikawa et al.
2018/0107047 A1 4/2018 Yin et al.
(Continued)

FOREIGN PATENT DOCUMENTS

CN 108389886 A 8/2018
JP 2020-64093 A 4/2020
(Continued)

OTHER PUBLICATIONS

WO 2021193789 A1 Machine Translation (Year: 2021).*
WO 2020067345 A1 Machine Translation (Year: 2020).*
International Search Report dated May 30, 2023, issued in counterpart International Application No. PCT/JP2023/006971. (2 pages).
Extended (supplementary) European Search Report dated Mar. 2, 2026, issued in counterpart EP Application No. 23779119.9 (7 pages).
(Continued)

*Primary Examiner* — Betelhem Shewareged
(74) *Attorney, Agent, or Firm* — WHDA, LLP

(57) ABSTRACT

Provided are an optical laminate that can be reduced in thickness and that can maintain excellent optical performance, and a method of producing the optical laminate. The optical laminate according to an embodiment of the present invention includes: a transparent layer having a thickness of 20 μm or less; a porous layer directly arranged in a predetermined pattern on one surface of the transparent layer in a thickness direction, the porous layer having a refractive index of 1.25 or less; an adhesion layer arranged on a side of the transparent layer opposite to the porous layer, the adhesion layer being brought into contact with the transparent layer; and a pressure-sensitive adhesive layer arranged on a side of the transparent layer opposite to the adhesion layer, the pressure-sensitive adhesive layer covering the porous layer.

6 Claims, 2 Drawing Sheets

(52) U.S. Cl.
CPC ... *B32B 2307/412* (2013.01); *B32B 2307/414* (2013.01); *B32B 2307/418* (2013.01)

(58) Field of Classification Search
USPC ........................................................ 428/195.1
See application file for complete search history.

(56) References Cited

U.S. PATENT DOCUMENTS

| | | | | |
|---|---|---|---|---|
| 2020/0024859 | A1* | 1/2020 | Spicer | B32B 27/304 |
| 2020/0355866 | A1* | 11/2020 | Hattori | H10H 20/856 |
| 2023/0152509 | A1 | 5/2023 | Yoshikawa et al. | |
| 2023/0312991 | A1 | 10/2023 | Hattori et al. | |
| 2025/0199230 | A1* | 6/2025 | Hattori | C09J 7/22 |

FOREIGN PATENT DOCUMENTS

| | | | |
|---|---|---|---|
| JP | 2021-101437 | A | 7/2021 |
| TW | 201935113 | A | 9/2019 |
| TW | 202141094 | A | 4/2021 |
| TW | 202129380 | A | 8/2021 |
| WO | 2014/031726 | A1 | 2/2014 |
| WO | 2021/193591 | A1 | 9/2021 |
| WO | 2021/193789 | A1 | 9/2021 |

OTHER PUBLICATIONS

Office Action dated Apr. 20, 2026, issued in counterpart TW Application No. 112109730, with English translation. (11 pages).

* cited by examiner

OPTICAL MULTILAYER BODY AND METHOD FOR PRODUCING OPTICAL MULTILAYER BODY

TECHNICAL FIELD

The present invention relates to an optical laminate and a method of producing an optical laminate.

BACKGROUND ART

It has been known that the propagation of light in a light guide plate for propagating light is optionally controlled by bonding an optical laminate including a low-refractive index layer having a refractive index lower than that of the light guide plate to the light guide plate. An investigation has been made on patterning such low-refractive index layer to impart a light extraction function to the optical laminate. There has been proposed, for example, an optical laminate including: a substrate; and a variable refractive index extraction layer arranged on the substrate, wherein the variable refractive index extraction layer includes a first region where a first substance having a relatively low refractive index is selectively printed, and a second region formed by overcoating the first substance with a second substance having a relatively high refractive index (see, for example, Patent Literature 1). The optical laminate described in Patent Literature 1 is bonded to a light guide plate via a pressure-sensitive adhesive layer, the pressure-sensitive adhesive layer being formed on the surface of the substrate opposite to the variable refractive index extraction layer. In recent years, the applications of an optical product including a light guide plate have been diversified, and the miniaturization of the optical product, and by extension, the thinning of the optical laminate bonded to the light guide plate have been desired. However, the thinning of the optical laminate described in Patent Literature 1 is difficult because the optical laminate includes the substrate where the first substance is selectively printed. The thinning of the substrate and the peeling and removal of the substrate from the variable refractive index extraction layer are considered, but the thinning of the substrate is difficult from the viewpoint of production stability of the optical laminate, and the peeling of the substrate may damage the variable refractive index extraction layer. In addition, there is a problem in that, when the substrate is peeled and a pressure-sensitive adhesive layer is directly arranged on the variable refractive index extraction layer, the optical performance of the variable refractive index extraction layer cannot be sufficiently maintained.

CITATION LIST

Patent Literature

[PTL 1] WO 2014/031726 A1

SUMMARY OF INVENTION

Technical Problem

The present invention has been made to solve the above-mentioned problem of the related art, and a primary object of the present invention is to provide an optical laminate that can be reduced in thickness and that can maintain excellent optical performance, and a method of producing the optical laminate.

Solution to Problem

According to one embodiment of the present invention, there is provided an optical laminate, including: a transparent layer having a thickness of 20 μm or less; a porous layer directly arranged in a predetermined pattern on one surface of the transparent layer in a thickness direction, the porous layer having a refractive index of 1.25 or less; an adhesion layer arranged on a side of the transparent layer opposite to the porous layer, the adhesion layer being brought into contact with the transparent layer; and a pressure-sensitive adhesive layer arranged on a side of the transparent layer opposite to the adhesion layer, the pressure-sensitive adhesive layer covering the porous layer.

In one embodiment, the transparent layer has a barrier function for suppressing a component for forming the adhesion layer from permeating through the porous layer.

In one embodiment, a porosity of the transparent layer is lower than a porosity of the porous layer.

In one embodiment, the pressure-sensitive adhesive layer includes a pressure-sensitive adhesive having a storage modulus of elasticity at 23° C. of $1.0\times10^5$ (Pa) or more.

According to another aspect of the present invention, there is provided a method of producing an optical laminate, including the steps of: forming a transparent layer having a thickness of 20 μm or less on a substrate; forming a porous layer having a refractive index of 1.25 or less in a pattern on a surface of the transparent layer opposite to the substrate; forming a pressure-sensitive adhesive layer so as to cover the porous layer from a side of the porous layer opposite to the transparent layer; peeling the substrate from the transparent layer; and forming an adhesion layer on a surface of the transparent layer opposite to the porous layer.

In one embodiment, a peel strength when the substrate is peeled from the transparent layer is 1 N/25 mm or less.

Advantageous Effects of Invention

According to the embodiment of the present invention, the optical laminate that can be reduced in thickness and that can maintain excellent optical performance can be achieved.

DESCRIPTION OF EMBODIMENTS

Embodiments of the present invention are described below. However, the present invention is not limited to these embodiments. First, the outline of the overall configuration of an optical laminate is described. Next, constituents of the optical laminate are specifically described.

A. Overall Configuration of Optical Laminate

Figure 1:
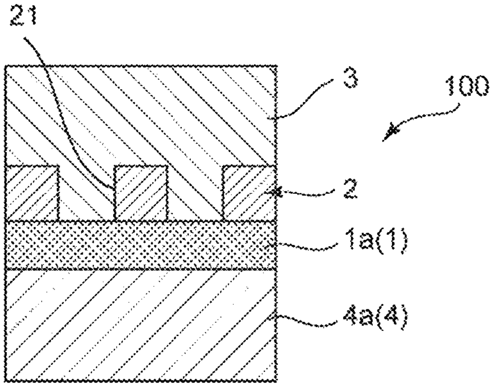
FIG. 1 is a schematic sectional view of an optical laminate according to one embodiment of the present invention.
Figure 2:
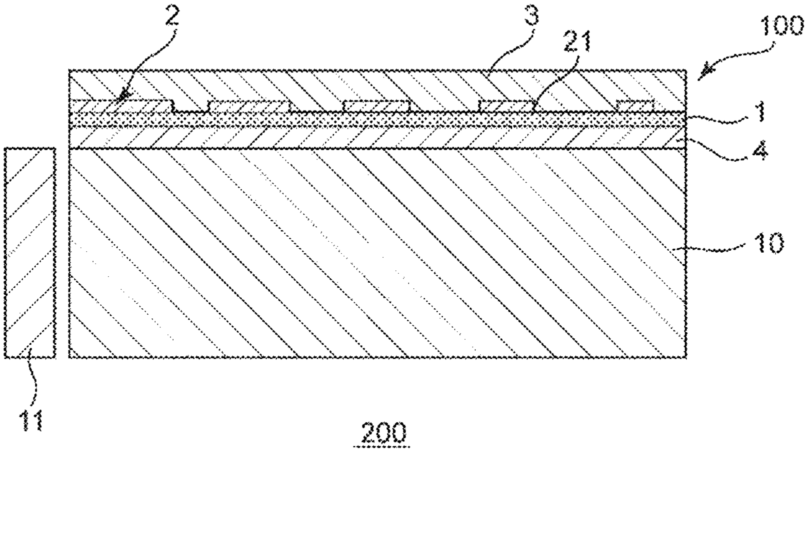
FIG. 2 is a schematic sectional view of an optical product including the optical laminate of FIG. 1.
Figure 3A:
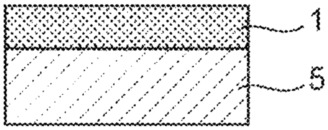
FIG. 3(*a*), FIG. 3(*b*), FIG. 3(*c*), FIG. 3(*d*), and FIG. 3(*e*) are each a schematic sectional view for illustrating a method of producing an optical laminate according to one embodiment of the present invention.
Figure 3B:
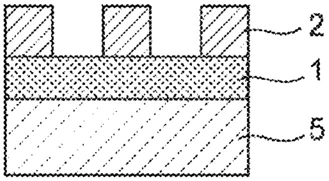
Figure 3C:
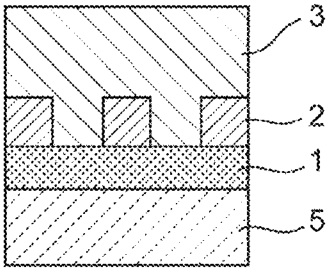
Figure 3D:
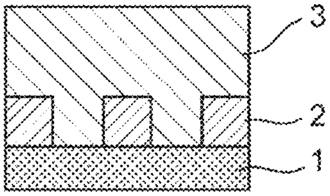
Figure 3E:
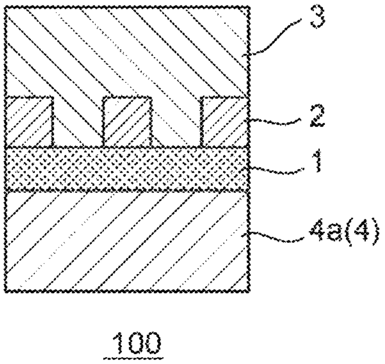

FIG. 1 is a schematic sectional view of an optical laminate according to one embodiment of the present invention. FIG. 2 is a schematic sectional view of an optical product including the optical laminate of FIG. 1. An optical laminate 100 of the illustrated example includes: a transparent layer 1 having a thickness of 20 μm or less; a porous layer 2 directly arranged in a predetermined pattern on one surface of the transparent layer 1 in a thickness direction, the porous layer 2 having a refractive index of 1.25 or less; an adhesion layer 4 arranged on a side of the transparent layer 1 opposite to the porous layer 2, the adhesion layer 4 being brought into contact with the transparent layer 1; and a pressure-sensitive adhesive layer 3 arranged on a side of the transparent layer 1 opposite to the adhesion layer 4, the pressure-sensitive adhesive layer 3 covering the porous layer 2. Such configuration can reduce the thickness of the optical laminate and maintain the refractive index of the porous layer to the above-mentioned upper limit or less because the transparent layer is arranged between the porous layer and the adhesion layer, and the transparent layer has a thickness of 20 μm or less. Accordingly, excellent optical performance of the optical laminate can be sufficiently maintained. The thickness of the transparent layer 1 is preferably 10 μm or less, more preferably 5 μm or less, still more preferably 4 μm or less, and is typically 0.1 μm or more. The porous layer 2 typically has pores therein. The refractive index of the porous layer 2 is preferably less than 1.20, more preferably 1.19 or less, still more preferably 1.18 or less, and is typically 1.10 or more. The refractive index refers to a refractive index measured at a wavelength of 550 nm unless otherwise stated.

In one embodiment, part of the one surface of the transparent layer 1 in the thickness direction may be exposed through the porous layer 2. The exposed portion is brought into contact with the pressure-sensitive adhesive layer 3.

Accordingly, the pressure-sensitive adhesive layer 3 is brought into contact with the porous layer 2 and the transparent layer 1. Thus, the transparent layer 1 can be suppressed from being peeled from the porous layer 2 during handling of the laminate before processing. The refractive index of the pressure-sensitive adhesive layer 3 is typically t higher than the refractive index of the porous layer 2. The refractive index of the pressure-sensitive adhesive layer 3 is more than 1.25, preferably 1.4 or more, and is typically 1.7 or less.

In one embodiment, the transparent layer 1 is a barrier layer 1*a* having a barrier function for suppressing a component for forming the adhesion layer 4 from permeating through the porous layer 2. Accordingly, the transparent layer 1 can stably suppress an increase in refractive index of the porous layer. The adhesion layer 4 may be a pressure-sensitive adhesive layer or an adhesive layer.

In one embodiment, the porosity of the transparent layer 1 is lower than the porosity of the porous layer 2. Such configuration can sufficiently secure the barrier performance of the transparent layer 1, and stably suppress a pressure-sensitive adhesive or adhesive for forming the adhesion layer from entering the pores of the porous layer.

The porosity of the transparent layer 1 is, for example, 15 vol % or less, preferably 10 vol % or less, and the lower limit thereof is, for example, 1 vol % or more. The porosity of the porous layer 2 is, for example, more than 10 vol %, preferably 20 vol % or more, more preferably 30 vol % or more, still more preferably 35 vol % or more, and is, for example, 60 vol % or less, preferably 55 vol % or less, more preferably 50 vol % or less, still more preferably 45 vol % or less. When the porosities fall within such ranges, the refractive index of the porous layer can be set within an appropriate range, and a predetermined mechanical strength can be secured. The porosity is a value calculated from the value of the refractive index measured with an ellipsometer by using Lorentz-Lorenz's formula.

In one embodiment, the pressure-sensitive adhesive layer 3 includes a pressure-sensitive adhesive having a storage modulus of elasticity at 23° C. of $1.0\times10^5$ (Pa) or more. The storage modulus of elasticity at 23° C. of the pressure-sensitive adhesive for forming the pressure-sensitive adhesive layer 3 is preferably $1.1\times10^5$ (Pa) or more, more preferably $1.2\times10^5$ (Pa) or more. When the storage modulus of elasticity of the pressure-sensitive adhesive is equal to or more than the above-mentioned lower limit, the pressure-sensitive adhesive for forming the pressure-sensitive adhesive layer can be suppressed from entering the pores of the porous layer. Accordingly, an increase in refractive index of the porous layer can be more stably suppressed. The storage modulus of elasticity is determined by reading a value at 23° C. at the time of measurement in conformity with a method described in JIS K 7244-1 "Plastics-Determination of dynamic mechanical properties" under the condition of a frequency of 1 Hz in the range of from −50° C. to 150° C. at a rate of temperature increase of 5° C./min. The upper limit of the storage modulus of elasticity at 23° C. of the pressure-sensitive adhesive for forming the pressure-sensitive adhesive layer 3 is typically $100\times10^5$ (Pa) or less.

The transparent layer, the porous layer, the adhesion layer, and the pressure-sensitive adhesive layer are specifically described below.

B. Transparent Layer

The transparent layer 1 can transmit light. The total light transmittance of the transparent layer 1 is, for example, from 70% to 100%, preferably from 80% to 99%. When the total light transmittance of the transparent layer falls within the above-mentioned ranges, excellent transparency can be achieved in the entirety of the optical laminate. As a result, adverse effects in the applications of the optical laminate can be suppressed.

Any appropriate configuration may be adopted for the transparent layer 1 as long as the layer can transmit light. Examples of the transparent layer 1 include a resin film and an inorganic thin film. Examples of a material for the resin film include: polyvinyl alcohol (PVA); a (meth)acrylic resin such as polymethyl methacrylate (PMMA); a polyvinyl acetal resin; a thermoplastic resin material having a polar group, such as a polycarbonate resin, a polyarylate resin, or a polyurethane-based resin; and a thermally or UV-curable resin material, such as an acrylic hard coat resin material, an epoxy-based hard coat resin material, or a silicone-based hard coat resin material. The term "(meth)acrylic" refers to acrylic and/or methacrylic. The materials for the resin film may be used alone or in combination thereof. In addition, the resin film may be formed of a resin composition alone, or any other substance may be added to change the physical properties of the resin film. Specifically, for example, a boric acid compound or a silane-based compound is added to introduce a cross-linking structure into PVA.

Examples of a material for the inorganic thin film include $SiO_2$, ZTO, ITO, IZO, $TiO_2$, Si, Zno, AZO, $Al_2O_3$, MgO, $MgF_2$, and SiN. The materials for the inorganic thin film may be used alone or in combination thereof.

C. Porous Layer

The porous layer 2 is directly arranged on the one surface of the transparent layer 1 in the thickness direction and has a predetermined pattern shape. The porous layer 2 typically has a plurality of openings 21 that define a pattern. In one embodiment, the porous layer 2 has a gradation pattern in which the proportion of the openings per unit area is increased toward one side of the transparent layer 1 in a predetermined direction perpendicular to the thickness direction. Any appropriate shape and size may be adopted for the openings 21. When the porous layer 2 has a gradation pattern, the openings 21 that have the same size may be distributed so as to be sparse toward one side in a predetermined direction, or the sizes of the openings 21 may be changed so as to be increased toward one side in a predetermined direction.

The total light transmittance of the porous layer 2 is, for example, from 85% to 99%, preferably from 87% to 98%, more preferably from 89% to 97%. The haze of the porous layer 2 is, for example, less than 58, preferably less than 3%. Meanwhile, the haze is, for example, 0.1% or more, preferably 0.2% or more. When such porous layer is arranged at a predetermined position, excellent transparency can be achieved in the entirety of the optical laminate. The haze may be measured by, for example, such a method as described below.

The pore layer (porous layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

$$\text{Haze } (\%)=[\text{diffuse transmittance } (\%)/\text{total light transmittance } (\%)]\times 100(\%)$$

The thickness of the porous layer 2 is, for example, from 30 nm to 5 μm, preferably from 200 nm to 4 μm, more preferably from 400 nm to 3 μm, still more preferably from 600 nm to 2 μm. When the thickness of the porous layer falls within such ranges, the porous layer can effectively exhibit a total reflection function for light beams ranging from visible light to light in the infrared region.

Any appropriate configuration may be adopted for the porous layer 2 as long as the layer has the above-mentioned desired characteristics. The porous layer may be preferably formed through application or printing. Materials described in, for example, WO 2004/113966 A1, JP 2013-254183 A, and JP 2012-189802 A may each be adopted as a material for forming the porous layer. A typical example thereof is a silicon compound. Examples of the silicon compound include: silica-based compounds; hydrolyzable silanes, and partial hydrolysates and dehydration condensates thereof; silanol group-containing silicon compounds; and active silica obtained by bringing a silicate into contact with an acid or an ion-exchange resin. The examples also include: organic polymers; polymerizable monomers (e.g., a (meth) acrylic monomer and a styrene-based monomer); and curable resins (e.g., a (meth)acrylic resin, a fluorine-containing resin, and a urethane resin). Those materials may be used alone or in combination thereof. The porous layer may be formed by, for example, applying or printing a solution or a dispersion liquid of such material.

The size of each of the pores (holes) in the porous layer refers to a major axis diameter out of the major axis diameter and minor axis diameter of the pore (hole). The sizes of the pores (holes) are, for example, from 2 nm to 500 nm. The sizes of the pores (holes) are, for example, 2 nm or more, preferably 5 nm or more, more preferably 10 nm or more, still more preferably 20 nm or more. Meanwhile, the sizes of the pores (holes) are, for example, 500 nm or less, preferably 200 nm or less, more preferably 100 nm or less. The range of the sizes of the pores (holes) is, for example, from 2 nm to 500 nm, preferably from 5 nm to 500 nm, more preferably from 10 nm to 200 nm, still more preferably from 20 nm to 100 nm. The sizes of the pores (holes) may be adjusted to desired sizes in accordance with, for example, purposes and applications.

The sizes of the pores (holes) may be quantified by a BET test method. Specifically, 0.1 g of a sample (formed pore layer) is loaded into the capillary of a specific surface area-measuring apparatus (manufactured by Micromeritics Instrument Corporation: ASAP 2020), and is then dried under reduced pressure at room temperature for 24 hours so that a gas in its pore structure is removed. Then, an adsorption isotherm is drawn by causing the sample to adsorb a nitrogen gas, and its pore size distribution is determined. Thus, the pore sizes may be evaluated.

The porous layer having the pores therein is, for example, a porous layer and/or a porous layer having an air layer in at least part thereof. The porous layer typically contains aerogel and/or particles (e.g., hollow fine particles and/or porous particles). The porous layer may be preferably a nanoporous layer (specifically a porous layer in which the diameters of 90% or more of micropores fall within the range of from $10^{-1}$ nm to $10^3$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope.

An example of the specific configuration of the porous layer is described below. The porous layer of this embodiment is formed of one or a plurality of kinds of constituent units each forming a fine pore structure, and the constituent units are chemically bonded to each other through a catalytic action. Examples of the shapes of the constituent units include a particle shape, a fiber shape, a rod shape, and a flat plate shape. The constituent units may have only one shape, or may have two or more shapes in combination. A case in which the porous layer is a pore layer of a porous body having the microporous particles chemically bonded to each other is mainly described below.

Such pore layer may be formed by, for example, chemically bonding the microporous particles (porous particles) to each other in a pore layer-forming step. In the embodiment of the present invention, the shapes of the "particles" (e.g., the microporous particles) are not particularly limited. For example, the shapes may each be a spherical shape or any other shape. In addition, in the embodiment of the present invention, the microporous particles may be, for example, sol-gel beaded particles, nanoparticles (hollow nanosilica nanoballoon particles), or nanofibers. The microporous particles each typically contain an inorganic substance. Specific examples of the inorganic substance include silicon (Si), magnesium (Mg), aluminum (Al), titanium (Ti), zinc (Zn), and zirconium (Zr). Those inorganic substances may be used alone or in combination thereof. In one embodiment, the microporous particles are, for example, microporous particles (porous particles) of a silicon compound, and the porous body is, for example, a silicone porous body. The microporous particles of the silicon compound each contain, for example, a pulverized body of a gel-like silicon compound. In addition, another form of the porous layer and/or the porous layer having the air layer in at least part thereof is, for example, a pore layer having the following features: the layer is formed of fibrous substances such as nanofibers;

and the fibrous substances are entangled with each other to form pores, thereby forming the layer. A method of producing such pore layer is not particularly limited, and is the same as that in the case of, for example, the pore layer of the porous body having the microporous particles chemically bonded to each other. Still another form thereof is, for example, a pore layer using hollow nanoparticles or nanoclay, or a pore layer formed by using hollow nanoballoons or magnesium fluoride. The pore layer may be a pore layer formed of a single constituent substance, or may be a pore layer formed of a plurality of constituent substances. The pore layer may include any one of the above-mentioned forms, or may include two or more of the above-mentioned forms.

In this embodiment, the porous structure of the porous body may be, for example, an open-cell structural body in which hole structures are continuous with each other. The open-cell structural body means, for example, that the hole structures are three-dimensionally continuous with each other in the silicone porous body, and can be said to be a state in which the internal pores of the hole structures are continuous with each other. When the porous body has an open-cell structure, its porosity can be increased. However, when closed-cell particles (particles each individually having a hole structure) such as hollow silica are used, an open-cell structure cannot be formed. Meanwhile, for example, when silica sol particles (pulverized products of a gel-like silicon compound that forms sol) are used, the particles each have a three-dimensional dendritic structure, and hence the dendritic particles are sedimented and deposited in a coating film (coating film of the sol containing the pulverized products of the gel-like silicon compound). Accordingly, an open-cell structure can be easily formed. The porous layer more preferably has a monolith structure in which an open-cell structure includes a plurality of pore size distributions. The monolith structure means, for example, a hierarchical structure including a structure in which nanosized fine pores are present and an open-cell structure in which the nanosized pores assemble. When the monolith structure is formed, both of a film strength and a high porosity can be achieved by, for example, imparting the high porosity to the layer through use of a coarse open-cell pore while imparting the film strength thereto through use of a fine pore. Such monolith structure may be preferably formed by controlling the pore size distribution of a pore structure to be produced in the gel (gel-like silicon compound) at a stage before its pulverization into the silica sol particles. In addition, the monolith structure may be formed by, for example, controlling the particle size distribution of the silica sol particles after the pulverization to a desired size at the time of the pulverization of the gel-like silicon compound.

The porous layer contains, for example, the pulverized products of a gel-like compound as described above, and the pulverized products are chemically bonded to each other. The form of the chemical bond (chemical bonding) between the pulverized products in the porous layer is not particularly limited, and examples thereof include a cross-linking bond, a covalent bond, and a hydrogen bond.

The volume-average particle diameter of the pulverized products in the porous layer is, for example, 0.05 μm or more, preferably 0.10 μm or more, more preferably 0.11 μm or more. Meanwhile, the volume-average particle diameter is, for example, 1.00 μm or less, preferably 0.90 μm or less, more preferably 0.50 μm or less. The range of the volume-average particle diameter is, for example, from 0.05 μm to 1.00 μm, preferably from 0.10 μm to 0.90 μm, more preferably from 0.11 μm to 0.55 μm. The particle size distribution of the pulverized products may be measured with, for example, a particle size distribution-evaluating apparatus based on a dynamic light scattering method, a laser diffraction method, or the like, and an electron microscope, such as a scanning electron microscope (SEM) or a transmission electron microscope (TEM). The volume-average particle diameter is an indicator of a variation in particle size of the pulverized products.

The kind of the gel-like compound is not particularly limited. The gel-like compound is, for example, a gel-like silicon compound.

In addition, in the porous layer (pore layer), for example, silicon atoms to be incorporated preferably form a siloxane bond. As a specific example, the ratio of unbonded silicon atoms (in other words, residual silanol groups) out of all the silicon atoms in the pore layer is, for example, less than 50%, preferably 30% or less, more preferably 15% or less.

D. Adhesion Layer

The adhesion layer 4, which is described in detail later, is arranged to bond the optical laminate 100 to an optical member (typically a light guide plate 10). The adhesion layer 4 is arranged on the surface of the transparent layer 1 opposite to the porous layer 2. The adhesion layer 4 is not brought into contact with the porous layer 2, and hence the configuration thereof is not particularly limited and any appropriate configuration may be adopted. As described above, the adhesion layer 4 may be a pressure-sensitive adhesive layer or an adhesive layer. When the adhesion layer 4 is a pressure-sensitive adhesive layer, the pressure-sensitive adhesive layer 3 and the adhesion layer 4 are distinguished from each other by being referred to as "first pressure-sensitive adhesive layer 3" and "second pressure-sensitive adhesive layer 4*a*," respectively.

An example of a pressure-sensitive adhesive for forming the second pressure-sensitive adhesive layer 4*a* is a (meth)acrylic pressure-sensitive adhesive. The thickness of the second pressure-sensitive adhesive layer 4*a* is, for example, 5 μm or more and 200 μm or less, preferably 100 μm or less.

Examples of an adhesive for forming the adhesive layer include a thermosetting adhesive and a UV-curable adhesive. The thickness of the adhesive layer is, for example, 0.1 μm or more and 200 μm or less.

E. Pressure-Sensitive Adhesive Layer (First Pressure-Sensitive Adhesive Layer)

The pressure-sensitive adhesive layer 3, which is described in detail later, is arranged to bond the optical laminate 100 to an optical member. That is, the optical laminate 100 has a double-sided pressure-sensitive adhesion or adhesion configuration in which two optical members can be connected to each other. In one embodiment, the pressure-sensitive adhesive layer 3 covers the porous layer 2 so as to embed the porous layer, and is brought into contact with the transparent layer 1 via the openings 21 of the porous layer 2.

Any appropriate pressure-sensitive adhesive may be used as the pressure-sensitive adhesive for forming the pressure-sensitive adhesive layer 3 as long as the pressure-sensitive adhesive has such characteristics as described above. The pressure-sensitive adhesive is typically, for example, an acrylic pressure-sensitive adhesive (acrylic pressure-sensitive adhesive composition). The acrylic pressure-sensitive adhesive composition typically contains a (meth)acrylic polymer as a main component (base polymer). The (meth)acrylic polymer may be incorporated into the pressure-sensitive adhesive composition at a ratio of, for example, 50 wt % or more, preferably 70 wt % or more, more preferably 90 wt % or more in the solid content of the pressure-sensitive adhesive composition. The (meth)acrylic polymer contains, as a main component, an alkyl (meth)acrylate serving as a monomer unit. The term "(meth)acrylate" refers to an acrylate and/or a methacrylate. The alkyl group of the alkyl (meth)acrylate is, for example, a linear or branched alkyl group having 1 to 18 carbon atoms. The average number of carbon atoms of the alkyl group is preferably from 3 to 9. As a monomer for forming the (meth)acrylic polymer, in addition to the alkyl (meth)acrylate, there are given comonomers, such as a carboxyl group-containing monomer, a hydroxyl group-containing monomer, an amide group-containing monomer, an aromatic ring-containing (meth)acrylate, and a heterocycle-containing (meth)acrylate. The comonomer is preferably a hydroxyl group-containing monomer and/or a heterocycle-containing (meth) acrylate, more preferably N-acryloylmorpholine. The acrylic pressure-sensitive adhesive composition may preferably contain a silane coupling agent and/or a cross-linking agent. The silane coupling agent is, for example, an epoxy group-containing silane coupling agent. The cross-linking agent is, for example, an isocyanate-based cross-linking agent or a peroxide-based cross-linking agent. Details about such pressure-sensitive adhesive layer or acrylic pressure-sensitive adhesive composition are described in, for example, JP 4140736 B2, the description of which is incorporated herein by reference.

The thickness of the pressure-sensitive adhesive layer 3 is, for example, from 3 μm to 30 μm, preferably from 5 μm to 10 μm. When the thickness of the pressure-sensitive adhesive layer falls within such ranges, the optical laminate can be thinned while the pressure-sensitive adhesive layer has a sufficient adhesion.

F. Method of Producing Optical Laminate

Next, a method of producing an optical laminate according to one embodiment is described.

FIG. 3(*a*) to FIG. 3(*e*) are each a schematic sectional view for illustrating a method of producing an optical laminate according to one embodiment of the present invention.

The method of producing an optical laminate according to one embodiment includes the steps of: forming a transparent layer 1 having a thickness of 20 μm or less on a substrate 5; forming a porous layer 2 having a refractive index of 1.25 or less in a pattern on a surface of the transparent layer 1 opposite to the substrate 5; forming a pressure-sensitive adhesive layer 3 so as to cover the porous layer 2 from a side of the porous layer 2 opposite to the transparent layer 1; peeling the substrate 5 from the transparent layer 1; and forming an adhesion layer 4 on a surface of the transparent layer 1 opposite to the porous layer 2.

In the method, first, the transparent layer 1 is formed on the substrate 5 by any appropriate method as illustrated in FIG. 3(*a*). The configuration of the substrate 5 is not particularly limited as long as the substrate 5 can support the transparent layer 1 and the porous layer 2 so as to enable the porous layer 2 to be stably formed in a pattern. Any appropriate resin film may be adopted as the substrate 5. Specific examples of a material serving as a main component of the resin film include: a cellulose-based resin such as triacetyl cellulose (TAC); a polyester-based resin such as polyethylene terephthalate (PET); a polyvinyl alcohol-based resin; a polycarbonate-based resin; a polyamide-based resin; a polyimide-based resin; a polyethersulfone-based resin; a polysulfone-based resin; a polystyrene-based resin; a polynorbornene-based resin; a polyolefin-based resin; a (meth)acrylic resin; and an acetate-based resin. Another example thereof is a thermosetting resin or a UV-curable resin, such as a (meth)acrylic resin, a urethane-based resin, a (meth)acrylic urethane-based resin, an epoxy-based resin, or a silicone-based resin. An inorganic thin film such as a copper oxide film may be arranged on the surface of the substrate 5.

The thickness of the substrate 5 is, for example, more than 5 μm, preferably 10 μm or more, and is, for example, 100 μm or less.

When the transparent layer 1 includes a resin film, a solution obtained by dissolving a material for the resin film is applied onto the substrate 5, and the coating film is then dried to form the transparent layer 1 (resin film). Alternatively, the transparent layer (resin film) separately prepared may be bonded to the substrate.

When the transparent layer 1 includes an inorganic thin film, a film is formed from a material for the inorganic thin film on the substrate 5 by a film-forming method such as sputtering. Thus, the transparent layer 1 (inorganic thin film) is formed.

Next, the porous layer 2 is formed in a pattern on the surface of the transparent layer 1 opposite to the substrate 5 by any appropriate method as illustrated in FIG. 3(*b*). In other words, the porous layer 2 is formed in a pattern on the transparent layer 1 under the state in which the transparent layer 1 is supported by the substrate 5. Accordingly, the porous layer 2 can be stably formed in a pattern.

In one embodiment, the step typically includes: a precursor-forming step of forming a pore structure, which is a precursor of the porous layer (pore layer), on the transparent layer; and a cross-linking reaction step of causing a cross-linking reaction in the precursor after the precursor-forming step. The step further includes: a containing liquid-producing step of producing a containing liquid containing microporous particles (hereinafter sometimes s referred to as "microporous particle-containing liquid" or simply "containing liquid"); and a drying step of drying the containing liquid. In the precursor-forming step, the microporous particles in a dried body are chemically bonded to each other to form the precursor. The containing liquid is not particularly limited, and is, for example, a suspension containing the microporous particles. A case in which the microporous particles are pulverized products of the gel-like compound, and the pore layer is a porous body (preferably a silicone porous body) containing the pulverized products of the gel-like compound is mainly described below. However, even when the microporous particles are products except the pulverized products of the gel-like compound, the porous layer may be similarly formed.

According to the above-mentioned method, for example, a porous layer (pore layer) having an extremely low refractive index is formed. A reason for the foregoing is assumed to be, for example, as described below. However, the assumption does not limit the method of forming the porous layer.

The pulverized products are obtained by pulverizing the gel-like silicon compound, and hence a state in which the three-dimensional structure of the gel-like silicon compound before the pulverization is dispersed in a three-dimensional basic structure is established. Further, in the above-mentioned method, the application or printing of the crushed products of the gel-like silicon compound onto the transparent layer results in the formation of the precursor of a porous structure based on the three-dimensional basic structure. In other words, according to the above-mentioned method, a new porous structure (three-dimensional basic structure) different from the three-dimensional structure of the gel-like silicon compound is formed by the application of the pulverized products. Accordingly, in the pore layer to be finally obtained, such a low refractive index that the layer functions to the same extent as, for example, an air layer does may be achieved. Further, in the above-mentioned method, the three-dimensional basic structure is fixed because the pulverized products are chemically bonded to each other. Accordingly, the pore layer to be finally obtained can maintain a sufficient strength and sufficient flexibility despite the fact that the layer is a structure having pores. Details about the specific configuration of the porous layer and the method of forming the porous layer are described in, for example, WO 2019/151073 A1, the description of which is incorporated herein by reference.

In one embodiment, the step is performed by printing the above-mentioned microporous particle-containing liquid in a predetermined pattern. Examples of a method for the printing include inkjet printing, gravure printing, and screen printing.

Next, the pressure-sensitive adhesive layer 3 covering the porous layer 2 is formed by any appropriate method as illustrated in FIG. 3(*c*). In one embodiment, a pressure-sensitive adhesive for forming the pressure-sensitive adhesive layer 3 is applied to the resin film and dried to form the pressure-sensitive adhesive layer 3 on the resin film, and the pressure-sensitive adhesive layer 3 is then bonded to the porous layer 2 and the transparent layer 1 so as to embed the porous layer 2.

Next, the substrate 5 is peeled from the transparent layer 1 as illustrated in FIG. 3(*d*). A peel strength when the substrate 5 is peeled from the transparent layer 1 is preferably 1 N/25 mm or less, more preferably 0.8 N/25 mm or less. The peel strength is measured by, for example, the following method.

From a laminated film of the substrate 5 and the transparent layer 1, a sample having a strip shape of 50 mm by 140 mm is obtained, and the surface of the sample on the substrate 5 side is fixed to a glass plate with a double-sided tape. A pressure-sensitive adhesive tape strip obtained by bonding an acrylic pressure-sensitive adhesive layer (thickness: 20 μm) to a PET film (T100: manufactured by Mitsubishi Plastics, Inc.), and cutting the resultant into 25 mm by 100 mm is bonded to the transparent layer side of the laminated film, resulting in laminating the PET film on the laminated film. Next, the sample is fixed with chucks in an Autograph tensile tester (manufactured by Shimadzu Corporation: AG-Xplus) such that a distance between the chucks is 100 mm, and the sample is then subjected to a tensile test at a tensile rate of 0.3 m/min. An average test strength when a 50 mm peel test is performed is defined as a pressure-sensitive adhesive peel strength, that is, a pressure-sensitive adhesive strength. An adhesive strength may also be measured by the same measurement method. In the present invention, there is no clear distinction between the "pressure-sensitive adhesive strength" and the "adhesive strength."

In one embodiment, the pressure-sensitive adhesive layer 3 is brought into contact with the transparent layer 1 via the openings 21 of the porous layer 2, and hence can suppress the peeling of the transparent layer 1 from the porous layer 2 along with the peeling of the substrate 5.

Next, the adhesion layer 4 is formed on the surface of the transparent layer 1 opposite to the porous layer 2 by any appropriate method as illustrated in FIG. 3(*e*). In one embodiment, a pressure-sensitive adhesive or adhesive for forming the adhesion layer 4 is applied to the resin film and dried to form the adhesion layer 4 on the resin film, and the adhesion layer 4 is then bonded to the transparent layer 1. Alternatively, the pressure-sensitive adhesive or the adhesive may be applied to the transparent layer and dried to form the adhesion layer.

Thus, an optical laminate having the configuration "pressure-sensitive adhesive layer/porous layer/transparent layer/adhesion layer" is produced.

G. Usage Form of Optical Laminate

The optical laminate according to the embodiment of the present invention is typically applicable to an optical product 200 including the light guide plate 10, and can extract light propagating in the light guide plate 10 to another optical member. In one embodiment, the optical laminate 100 is bonded to the light guide plate 10 via the adhesion layer 4 as illustrated in FIG. 2. Although not shown, another optical laminate is bonded to the pressure-sensitive adhesive layer 3 of the optical laminate 100.

The light guide plate 10 typically allows light having entered the light guide plate 10 from a light source 11 (typically an LED) to propagate in a predetermined direction (horizontal direction in FIG. 2). The porous layer 2 is preferably arranged so that a portion having a relatively small opening area is positioned on the light source 11 side of the light guide plate 10 and a portion having a relatively large opening area is positioned on the side thereof opposite to the light source 11. Thus, the optical laminate 100 can uniformly extract light from the light guide plate 10 and transmit the extracted light to the other optical member. In addition, the optical laminate 100 is thinned as described above, and hence can suppress the occurrence of a color shift.

EXAMPLES

The present invention is specifically described below by way of Examples. However, the present invention is not limited to these Examples. Measurement methods for characteristics are as described below. In addition, "%" and "part(s)" in Examples are by weight unless otherwise stated.

(1) Refractive Index

Before a pressure-sensitive adhesive layer was bonded onto a porous layer, a piece obtained by forming a porous layer and then cutting the resultant into a size measuring 25 mm by 50 mm was bonded to the front surface of a glass plate (thickness: 3 mm) via a pressure-sensitive adhesive. A central portion (having a diameter of about 20 mm) on the back surface of the glass plate was daubed with a black marker pen. Thus, a sample in which light was not reflected on the back surface of the glass plate was obtained. The sample was set in an ellipsometer (manufactured by J.A. Woollam Japan: VASE), and its refractive index was measured under the conditions of a wavelength of 550 nm and an incident angle of from 50° to 80°.

Meanwhile, in the measurement of the refractive index of a structure with a pressure-sensitive adhesive, a pressure-sensitive adhesive layer was bonded onto the formed porous layer. After that, a laser beam (λ=407 nm) was caused to enter from a transparent layer side with a prism coupler (manufactured by Metricon Corporation), a refractive index at 407 nm was calculated from a measured value at a total reflection angle, and was then converted into a refractive index at 550 nm through use of the wavelength distribution of the refractive index separately calculated with an ellipsometer (manufactured by J.A. Woollam Japan).

(2) Optical Durability

An optical laminate obtained in each of Examples and Comparative Examples was placed in an oven at 65° C. and 95% RH (relative humidity), and a heating and humidification durability test was performed for 1,000 h. The degree of an increase in refractive index after the heating and humidification durability test relative to an initial refractive index was measured. The laminate having an increase degree of 0.05 or less was evaluated as satisfactory (marked with the symbol "○"), and the laminate having an increase degree of more than 0.05 was evaluated as unsatisfactory (marked with the symbol "x"). The results are shown in Table 1.

[Production Example 1] Preparation of Coating Liquid for Forming Porous Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature (23° C.) for 30 minutes so that MTMS was hydrolyzed. Thus, a mixed liquid B containing tris(hydroxy)methylsilane was produced.

0.38 g of 28 wt % ammonia water and 0.2 g of pure water were added to 5.5 g of DMSO, and the mixed liquid B was then further added to the mixture, followed by stirring at room temperature (23° C.) for 15 minutes to perform the gelation of tris(hydroxy)methylsilane. Thus, a mixed liquid C containing a gel-like silicon compound was obtained.

(2) Aging Treatment

Aging treatment was performed by incubating the mixed liquid C containing the gel-like silicon compound, which had been prepared as described above, as it was at 40° C. for 20 hours.

(3) Pulverization Treatment

Next, the gel-like silicon compound subjected to the aging treatment as described above was crushed into granular shapes each having a size of from several millimeters to several centimeters with a spatula. Next, 40 g of isobutyl alcohol (IBA) was added to the mixed liquid C, and the mixture was lightly stirred. After that, the mixture was left at rest at room temperature for 6 hours, and the solvent and the catalyst in the gel were decanted. The same decantation treatment was performed three times to replace the solvent with IBA. Thus, a mixed liquid D was obtained. Next, the gel-like silicon compound in the mixed liquid D was subjected to pulverization treatment (high-pressure media-less pulverization). The pulverization treatment (high-pressure media-less pulverization) was performed as follows: a homogenizer (manufactured by SMT Co., Ltd., product name: "UH-50") was used, and 1.85 g of the gel-like silicon compound in the mixed liquid D and 1.15 g of IBA were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid D was turned into a sol liquid E of the pulverized products. A volume-average particle diameter representing a variation in particle size of the pulverized products in the sol liquid E was determined to be from 0.10 μm to 0.30 μm with a dynamic light scattering-type Nanotrac particle size analyzer (manufactured by Nikkiso Co., Ltd., model UPA-EX150). Further, a methyl ethyl ketone (MEK) solution of a photobase generator (Wako Pure Chemical Industries, Ltd.: product name: WPBG-266) having a concentration of 1.5 wt % and a MEK solution of bis(trimethoxysilyl) hexane having a concentration of 5% were added at ratios of 0.062 g and 0.036 g, respectively, to 0.75 g of the sol liquid E. Thus, a coating liquid for forming a porous layer was obtained.

[Production Example 2] Preparation of First Pressure-Sensitive Adhesive Layer 90.7 Parts of butyl acrylate, 6 parts of N-acryloylmorpholine, 3 parts of acrylic acid, 0.3 part of 2-hydroxybutyl acrylate, and 0.1 part by weight of 2,2'-azobisisobutyronitrile serving as a polymerization initiator were loaded into a four-necked flask including a stirring blade, a temperature gauge, a nitrogen gas-introducing tube, and a condenser together with 100 g of ethyl acetate, and a nitrogen gas was introduced to purge the flask with nitrogen while the mixture was gently stirred. After that, while a liquid temperature in the flask was kept at around 55° C., a polymerization reaction was performed for 8 hours to prepare an acrylic polymer solution. 0.2 Part of an isocyanate cross-linking agent (CORONATE L manufactured by Nippon Polyurethane Industry Co., Ltd., tolylene diisocyanate adduct of trimethylolpropane), 0.3 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive solution. Next, the acrylic pressure-sensitive adhesive solution was applied to one surface of a silicone-treated polyethylene terephthalate (PET) film (manufactured by Mitsubishi Chemical Polyester Film Co., Ltd., thickness: 38 μm) so that the thickness of a first pressure-sensitive adhesive layer after drying became 10 μm, followed by drying at 150° C. for 3 minutes. Thus, the first pressure-sensitive adhesive layer was formed. The resultant pressure-sensitive adhesive layer had a storage modulus of elasticity of $1.3\times10^5$ (Pa).

[Production Example 3] Preparation of Second Pressure-Sensitive Adhesive Layer 99 Parts of butyl acrylate, 1 part of 4-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 parts of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.1 Part of an isocyanate cross-linking agent (TAKENATE D110N manufactured by Mitsui Takeda Chemicals Inc., trimethylolpropane xylylene diisocyanate), 0.1 part of benzoyl peroxide (NYPER BMT manufactured by Nippon Oil Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive composition solution. Next, the acrylic pressure-sensitive adhesive composition solution was applied to one surface of a polyethylene terephthalate film treated with a silicone-based releasing agent (separator film: manufactured by Mitsubishi Chemical Polyester Film Co., Ltd., MRF 38), and was dried at 150° C. for 3 minutes to form a second pressure-sensitive adhesive layer having a thickness of 12 μm on the surface of the separator film. The resultant pressure-sensitive adhesive layer had storage modulus of elasticity of $8.2\times10^4$ (Pa).

Example 1

A polyvinyl alcohol (PVA) aqueous solution was applied onto a substrate (PET resin film), and the coating film was then dried. Thus, a PVA layer serving as a transparent layer was formed on the substrate. The thickness of the PVA layer was 3 μm.

Next, the coating liquid for forming a porous layer of Production Example 1 was applied in a pattern to the surface of the PVA layer opposite to the substrate by gravure printing, and the coating film was then dried. Thus, the porous layer having a pattern was formed on the PVA layer. The pattern of the porous layer had a gradation distribution in which the proportion of openings per unit area was increased toward one side in a width direction. The refractive index of the porous layer was 1.19. The thickness of the porous layer was 0.9 μm.

Next, the first pressure-sensitive adhesive layer obtained in Production Example 2 was bonded to the porous layer.

Next, the PET substrate was peeled from the PVA layer at a peel angle of 180° and a peel rate of 300 mm/min. A peel strength at that time was measured with an Autograph tensile tester. The results are shown in Table 1.

Next, the second pressure-sensitive adhesive layer obtained in Production Example 3 was bonded to the surface of the PVA layer opposite to the porous layer.

As a result, an optical laminate having the configuration "first pressure-sensitive adhesive layer/porous layer/transparent layer/second pressure-sensitive adhesive layer" was obtained.

Example 2

An optical laminate was obtained in the same manner as in Example 1 except that a polymethyl methacrylate (PMMA) aqueous solution was used instead of the PVA aqueous solution to form a PMMA layer serving as the transparent layer on the substrate.

Example 3

An optical laminate was obtained in the same manner as in Example 1 except that a solution of polyvinyl acetal in ethanol was used instead of the PVA aqueous solution to form a polyvinyl acetal layer serving as the transparent layer on the substrate.

Example 4

An optical laminate was obtained in the same manner as in Example 1 except that: a substrate in which a CuO sputtered film was laminated on a polyethylene terephthalate (PET) film was prepared; and a $SiO_2$ layer serving as the transparent layer was formed on the CuO sputtered film by sputtering.

Example 5

An optical laminate was obtained in the same manner as in Example 1 except that the coating liquid for forming a porous layer of Production Example 1 was applied in a pattern by inkjet printing instead of the gravure printing.

Comparative Example 1

The coating liquid for forming a porous layer of Production Example 1 was applied in a pattern to a substrate (cycloolefin (COP) film; ZF16; manufactured by Zeon Corporation) having a thickness of 100 μm by gravure printing, and the coating film was then dried. Thus, the porous layer having a pattern was formed on the substrate.

Next, the first pressure-sensitive adhesive layer obtained in Production Example 2 was bonded to the porous layer. Next, the substrate was peeled from the porous layer, and the second pressure-sensitive adhesive layer obtained in Production Example 3 was bonded to the surface of the porous layer from which the substrate was peeled.

As a result, an optical laminate having the configuration "first pressure-sensitive adhesive layer/porous layer/second pressure-sensitive adhesive layer" was obtained.

Comparative Example 2

The coating liquid for forming a porous layer of Production Example 1 was applied in a pattern onto a substrate (acrylic resin film) having a thickness of 30 μm by gravure printing, and the coating film was then dried. Thus, the porous layer having a pattern was formed on the substrate.

Next, the first pressure-sensitive adhesive layer obtained in Production Example 2 was bonded to the porous layer. Next, the second pressure-sensitive adhesive layer obtained in Production Example 3 was bonded to the surface of the substrate opposite to the porous layer.

As a result, an optical laminate having the configuration "first pressure-sensitive adhesive layer/porous layer/substrate/second pressure-sensitive adhesive layer" was obtained.

TABLE 1

| | | No. | | | | | | |
|---|---|---|---|---|---|---|---|---|
| | | Example 1 | Example 2 | Example 3 | Example 4 | Example 5 | Comparative Example 1 | Comparative Example 2 |
| First pressure-sensitive adhesive layer | Material | Production Example 2 | Production Example 2 | Production Example 2 | Production Example 2 | Production Example 2 | Production Example 2 | Production Example 2 |
| | Thickness [μm] | 10 | 10 | 10 | 10 | 10 | 10 | 10 |
| Porous layer | Material | Production Example 1 | Production Example 1 | Production Example 1 | Production Example 1 | Production Example 1 | Production Example 1 | Production Example 1 |
| | Printing method | | Gravure | | | Inkjet | Gravure | Gravure |
| | Thickness [μm] | 0.9 | 0.9 | 0.9 | 0.9 | 0.9 | 0.9 | 0.9 |

TABLE 1-continued

| | | No. | | | | | | |
|---|---|---|---|---|---|---|---|---|
| | | Example 1 | Example 2 | Example 3 | Example 4 | Example 5 | Comparative Example 1 | Comparative Example 2 |
| Transparent layer | Material | PVA | PMMA | Polyvinyl acetal | $SiO_2$ | PVA | | Acrylic |
| | Thickness [μm] | 3 | 3 | 3 | 1 | 3 | | 30 |
| Second pressure-sensitive adhesive layer | Material | Production Example 3 | Production Example 3 | Production Example 3 | Production Example 3 | Production Example 3 | Production Example 3 | Production Example 3 |
| | Thickness [μm] | 12 | 12 | 12 | 12 | 12 | 12 | 12 |
| Peel strength | [N/25 mm] | 0.1 | 0.1 | 0.1 | 0.5 | 0.1 | — | — |
| Total thickness | [μm] | 25 | 25 | 25 | 23 | 25 | 22 | 52 |
| Optical durability | | ○ | ○ | ○ | ○ | ○ | x | ○ |

As apparent from Table 1, it is found that, according to each of Examples of the present invention, the optical laminate can be reduced in thickness and excellent optical durability thereof can be achieved by arranging the transparent layer having a thickness of 20 μm or less between the porous layer having a pattern and the adhesion layer.

INDUSTRIAL APPLICABILITY

The optical laminate according to each of the embodiments of the present invention can be used in various optical products, and in particular, can be suitably used in an optical product including a light guide plate.

REFERENCE SIGNS LIST

1 transparent layer
1*a* barrier layer
2 porous layer
21 opening
3 pressure-sensitive adhesive layer
4 adhesion layer
100 optical laminate
200 optical product

The invention claimed is:

1. An optical laminate, comprising:

a transparent layer having a thickness of 20 μm or less;

a porous layer directly arranged in a predetermined pattern on one surface of the transparent layer in a thickness direction, the porous layer having a refractive index of 1.25 or less;

an adhesion layer arranged on a side of the transparent layer opposite to the porous layer, the adhesion layer being brought into contact with the transparent layer; and a pressure-sensitive adhesive layer arranged on a side of the transparent layer opposite to the adhesion layer, the pressure-sensitive adhesive layer covering the porous layer, wherein the pressure-sensitive adhesive layer is brought into contact with the transparent layer via openings of the porous layer.

2. The optical laminate according to claim 1, wherein the transparent layer has a barrier function for suppressing a component for forming the adhesion layer from permeating through the porous layer.

3. The optical laminate according to claim 2, wherein a porosity of the transparent layer is lower than a porosity of the porous layer.

4. The optical laminate according to claim 1, wherein the pressure-sensitive adhesive layer includes a pressure-sensitive adhesive having a storage modulus of elasticity at 23° C. of $1.0\times10^5$ (Pa) or more.

5. A method of producing an optical laminate, comprising the steps of:

forming a transparent layer having a thickness of 20 μm or less on a substrate;

forming a porous layer having a refractive index of 1.25 or less in a pattern on a surface of the transparent layer opposite to the substrate;

forming a pressure-sensitive adhesive layer so as to cover the porous layer from a side of the porous layer opposite to the transparent layer, wherein the pressure-sensitive adhesive layer is brought into contact with the transparent layer via openings of the porous layer;

peeling the substrate from the transparent layer; and forming an adhesion layer on a surface of the transparent layer opposite to the porous layer.

6. The method of producing an optical laminate according to claim 5, wherein a peel strength when the substrate is peeled from the transparent layer is 1 N/25 mm or less.

* * * * *